(12) United States Patent
Lester

(10) Patent No.: US 7,363,302 B2
(45) Date of Patent: Apr. 22, 2008

(54) PROMOTING AND/OR DEMOTING AN ADVERTISEMENT FROM AN ADVERTISING SPOT OF ONE TYPE TO AN ADVERTISING SPOT OF ANOTHER TYPE

(75) Inventor: Chad Lester, Redwood City, CA (US)

(73) Assignee: Googole, Inc., Mountain View, CA (US)

( * ) Notice: Subject to any disclaimer, the term of this patent is extended or adjusted under 35 U.S.C. 154(b) by 6 days.

(21) Appl. No.: 10/610,311

(22) Filed: Jun. 30, 2003

(65) Prior Publication Data

US 2004/0267806 A1   Dec. 30, 2004

(51) Int. Cl.
*G06F 7/06* (2006.01)

(52) U.S. Cl. .................. 707/7; 715/517; 707/101

(58) Field of Classification Search ............ 707/3, 707/101, 103 R; 709/224; 705/14; 715/517, 715/513
See application file for complete search history.

(56) References Cited

U.S. PATENT DOCUMENTS

| | | | | |
|---|---|---|---|---|
| 5,754,939 A | * | 5/1998 | Herz et al. ............. | 455/3.04 |
| 5,999,912 A | * | 12/1999 | Wodarz et al. .......... | 705/14 |
| 6,269,361 B1 | * | 7/2001 | Davis et al. ............ | 707/3 |
| 6,714,975 B1 | * | 3/2004 | Aggarwal et al. ....... | 709/224 |
| 2001/0034647 A1 | * | 10/2001 | Marks et al. ........... | 705/14 |
| 2003/0149937 A1 | * | 8/2003 | McElfresh et al. ...... | 715/517 |

OTHER PUBLICATIONS

Bernard, "User Expectations For the Location of Web Objects", Mar. 31, 2001, CHI, pp. 171-172.*
Controlling sounds in Flash 5, Usnet Groups, Google search, Nov. 12, 2000, 2 pages.*
Thomas P. Novak et al, "New mwtrics for new media: toward the development of Web measurement standards", 1997, World Wide Web Journal, vol. 2, Issue 1, pp. 213-246.*
Robert Sedgewick, *Algorithms in C: Third Edition*, pp. 253-474, Addison-Wesley (1998).

* cited by examiner

*Primary Examiner*—Paul Rodriguez
*Assistant Examiner*—Luke Osborne
(74) *Attorney, Agent, or Firm*—Straub & Pokotylo; John C. Pokotylo

(57) ABSTRACT

Ads may be promoted to a more preferred ad spot type and/or demoted to a less preferred ad spot type in a manner that maximizes or increases their economic values and/or their utility to their audience. Such promoting and/or demoting may be done based on accepted ad monetary amount information and/or ad performance information.

61 Claims, 7 Drawing Sheets

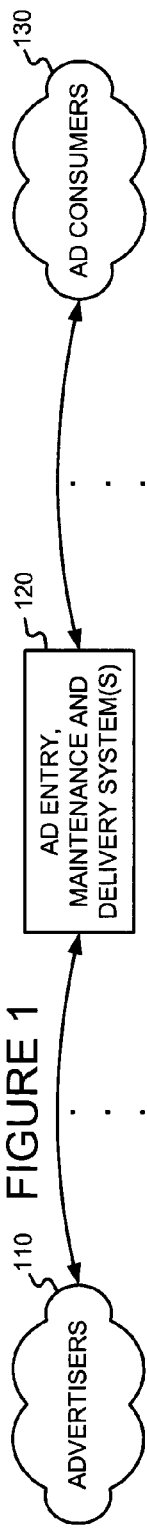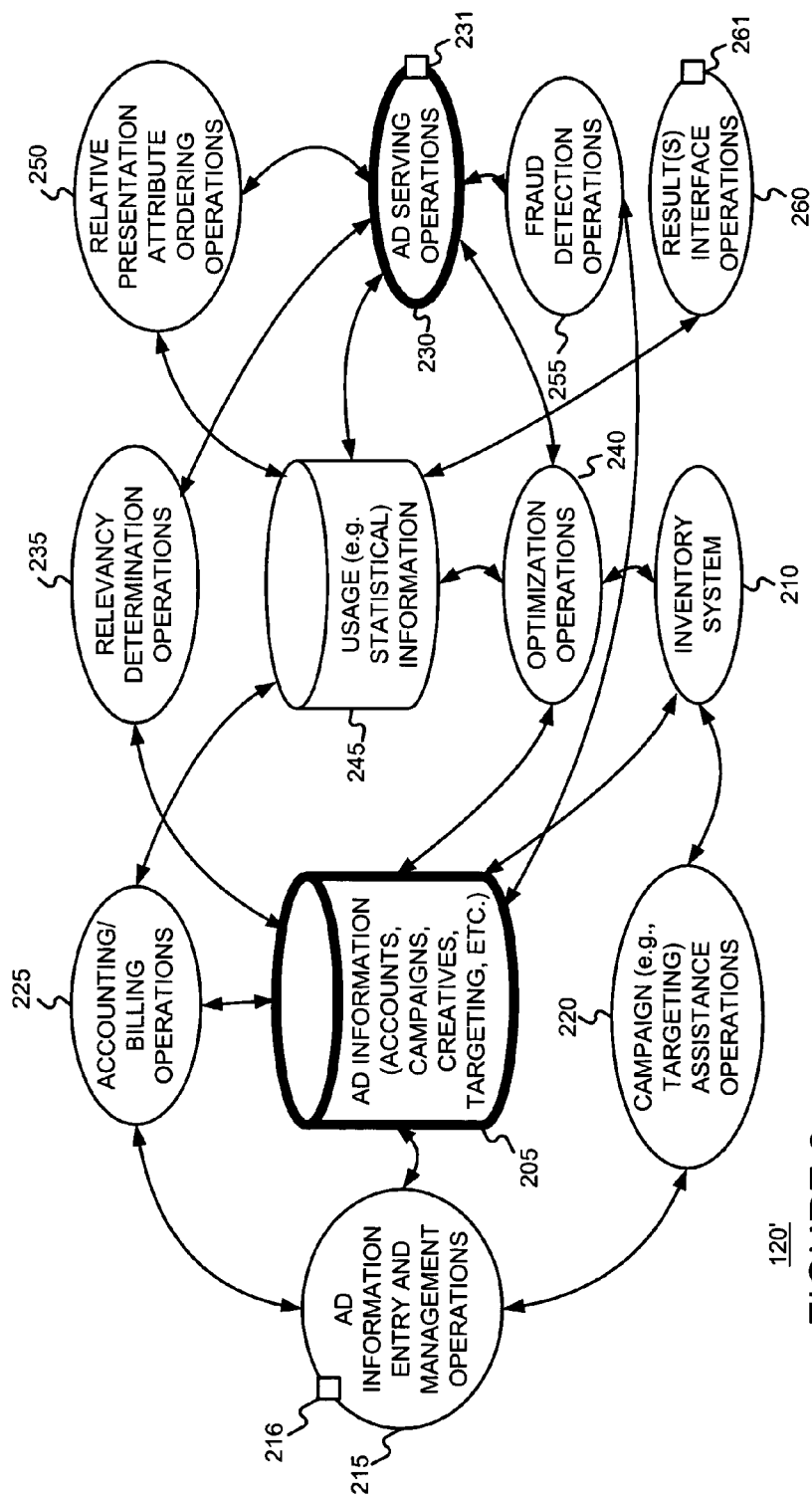

700

PROMOTING AND/OR DEMOTING AN ADVERTISEMENT FROM AN ADVERTISING SPOT OF ONE TYPE TO AN ADVERTISING SPOT OF ANOTHER TYPE

§ 1. BACKGROUND OF THE INVENTION

§ 1.1 Field of the Invention

The present invention concerns advertising. In particular, the present invention concerns the way ads are to be presented to their audience.

§ 1.2 Related Art

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Web sites" in the specification without loss of generality) as conduits to reach a large audience. Using this first approach, an advertiser may place ads on the home page of popular Web sites such as the New York Times™ Web site, or the USA Today™ Web site, for example. In another strategy, an advertiser may attempt to target its ads to more narrow niche audiences, thereby increasing the likelihood of a positive response by the audience. For example, an agency promoting tourism in the Costa Rican rainforest might place ads on the ecotourism-travel subdirectory of the Yahoo Web site. An advertiser will normally determine such targeting manually.

Regardless of the strategy, Web site-based ads (also referred to as "Web ads") are often presented to their advertising audience in the form of "banner ads"—i.e., a rectangular box that includes graphic components. When a member of the advertising audience (referred to as a "viewer" or "user" in the Specification without loss of generality) selects one of these banner ads by clicking on it, embedded hypertext links typically direct the viewer to the advertiser's Web site. This process, wherein the viewer selects an ad, is commonly referred to as a "click-through" ("Click-through" is intended to cover any user selection.). The ratio of the number of click-throughs to the number of impressions of the ad (i.e., the number of times an ad is displayed) is commonly referred to as the "click-through rate" of the ad. A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, etc. Often, if user actions don't indicate a consummated purchase, they may indicate a sales lead, although user actions constituting a conversion are not limited to this. Indeed, many other definitions of what constitutes a conversion are possible. The ratio of the number of conversions to the number of impressions of the ad (i.e., the number of times an ad is displayed) is commonly referred to as the conversion rate. If a conversion is defined to be able to occur within a predetermined time since the serving of an ad, one possible definition of the conversion rate might only consider ads that have been served more than the predetermined time in the past.

Despite the initial promise of Web site-based advertisement, there remain several problems with existing approaches. Although advertisers are able to reach a large audience, they are frequently dissatisfied with the return on their advertisement investment. Some have attempted to improve ad performance by tracking the online habits of users, but this approach has led to privacy concerns.

Similarly, the hosts of Web sites on which the ads are presented (referred to as "Web site hosts" or "ad consumers") have the challenge of maximizing ad revenue without impairing their users' experience. Some Web site hosts have chosen to place advertising revenues over the interests of users. One such Web site is "Overture.com", which hosts a so-called "search engine" service returning advertisements masquerading as "search results" in response to user queries. The Overture.com web site permits advertisers to pay to position an ad for their Web site (or a target Web site) higher up on the list of purported search results. If such schemes where the advertiser only pays if a user clicks on the ad (i.e., cost-per-click) are implemented, the advertiser lacks incentive to target their ads effectively, since a poorly targeted ad will not be clicked and therefore will not require payment. Consequently, high cost-per-click ads show up near or at the top, but do not necessarily translate into real revenue for the ad publisher because viewers don't click on them. Furthermore, ads that viewers would click on are further down the list, or not on the list at all, and so relevancy of ads is compromised.

There remains, therefore, a need for more effective advertising using interactive media and services, including a need to serve ads in a manner that increases their relevance to a viewer and/or their economic value to an advertiser and/or an ad server.

§ 2. SUMMARY OF THE INVENTION

The present invention provides a more effective advertising system that can promote ads to an ad spot of a more preferred ad spot type and/or demote ads to an ad spot of a less preferred ad spot type in a manner that increases their economic values and/or their utility to their audience. Such promoting and/or demoting may be done based on accepted ad price information and/or ad performance information.

The price information may be based on one or more of the following: (a) an amount that an advertiser has agreed to pay each time the ad is rendered; (b) a maximum amount that an advertiser is willing to pay each time the ad is rendered; (c) an amount that an advertiser has agreed to pay each time the ad is rendered and selected; (d) a maximum amount that an advertiser is willing to pay each time the ad is rendered and selected; (e) an average over time of the amount that the advertiser has agreed to pay each time the ad is rendered and selected; (f) an average over time of the maximum amount that the advertiser is willing to pay each time the ad is rendered and selected; (g) an amount that the advertiser has agreed to pay each time the ad is rendered and a conversion, associated with the ad, occurs; (h) a maximum amount that the advertiser is willing to pay each time the ad is rendered and a conversion, associated with the ad, occurs; (i) cost per selection information; (j) cost per conversion information; (k) an average of cost per selection information over a period of time; (l) an average cost per conversion information over time; etc.

The performance information may be a measure of user interest in the associated advertisement. For example, performance information may be a function of one or more of the following: (a) a click-through rate of the associated advertisement, (b) user ratings of the advertisement, (c) focus group ratings of the advertisement, (d) a measure of user interest for the advertisement weighted for a size of the advertisement relative to that of other advertisements, (e) a measure of user interest for the advertisement weighted for past positions of the advertisement relative to those past positions of other advertisements, (f) expected user interest in the advertisement, (g) a time needed to render the advertisement relative to that needed to render other advertisements, (h) a measure of user interest for the advertisement weighted for a media type of the advertisement, (i) a conversion rate associated with the advertisement, etc. The performance information may include estimates of user interest in the associated advertisement.

Price information and/or performance information may be weighted or otherwise adjusted. Window functions may be used to determine a relevant time frame or number of data to be considered.

§ 3. BRIEF DESCRIPTION OF THE DRAWINGS

FIG. 1 is a high-level diagram showing parties or entities that can interact with an advertising system.

FIG. 2 is a bubble chart of an advertising environment in which the present invention may operate.

§ 4. DETAILED DESCRIPTION

Figure 3A:
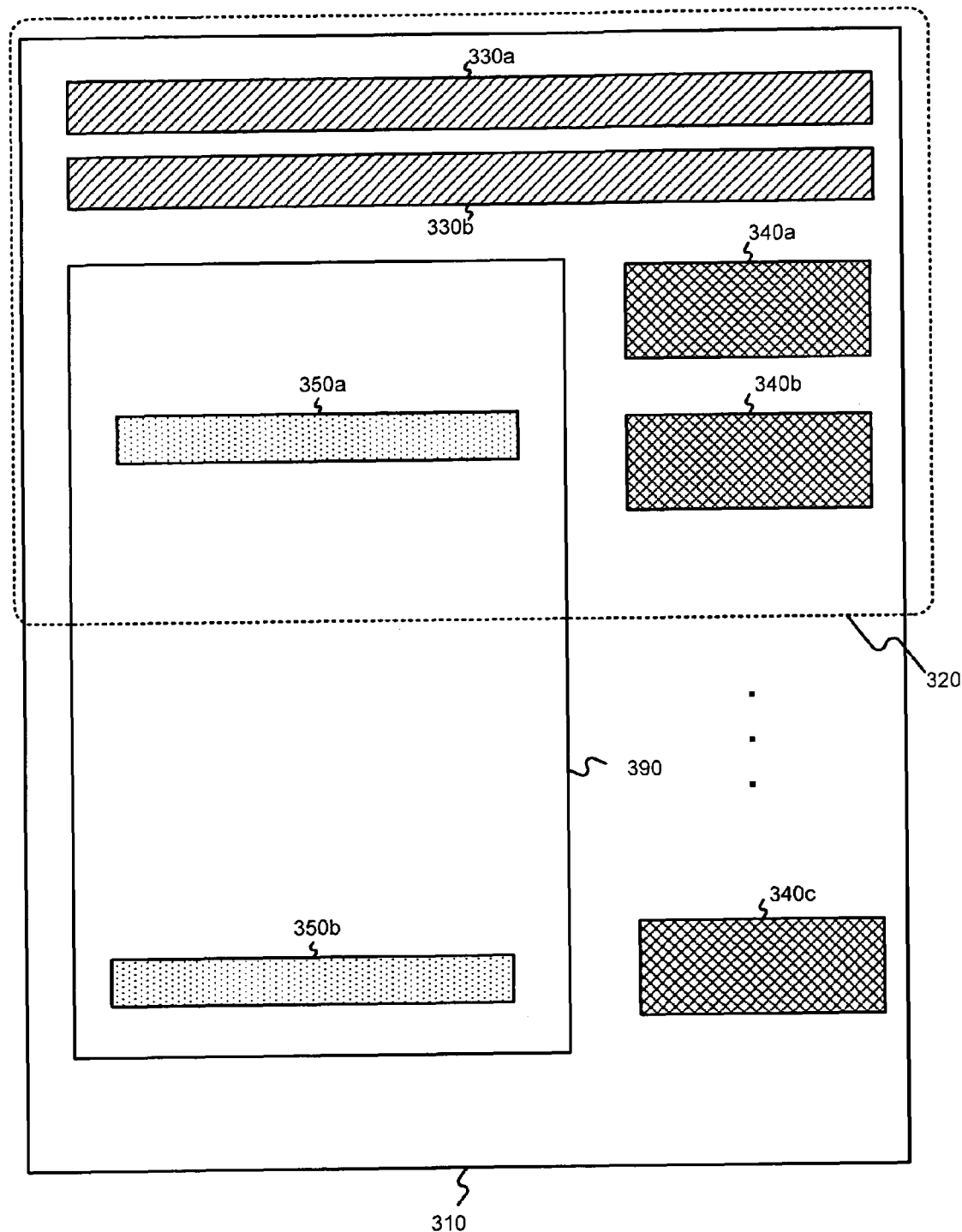
FIGS. 3A and 3B illustrate example of a document having available ad spots of different types.

The present invention involves novel methods, apparatus, message formats and/or data structures for effectively serving advertisements in an interactive environment. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as the following disclosed methods, apparatus, message formats and data structures and any other patentable subject matter.

In the following, environments in which the present invention may operate are described in § 4.1. Then, exemplary embodiments of the present invention are described in § 4.2. An example of operations of an exemplary embodiment of the present invention is then provided in § 4.3. Finally, some conclusions regarding the present invention are set forth in § 4.4.

§ 4.1 Environments in which the Present Invention may Operate

§ 4.1.1 Exemplary Advertising Envoronment

FIG. 1 is a high level diagram of an advertising environment. The environment may include an ad entry, maintenance and delivery system 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, meta information, and/or machine executable instructions. Ad consumers 130 may submit requests for ads to, accept ads responsive to their request from, and provide usage information to, the system 120. Although not shown, other entities may provide usage information (e.g., whether or not a conversion or click-through related to the ad occurred) to the system 120. This usage information may include measured or observed user behavior related to ads that have been served.

One example of an ad consumer 130 is a general content server that receives requests for content (e.g., articles, discussion threads, music, video, graphics, search results, web page listings, etc.), and retrieves the requested content in response to, or otherwise services, the request. The content server may submit a request for ads to the system 120. Such an ad request may include a number and/or type of ads desired. The ad request may also include content request information. This information may include the content itself (e.g., a document such as a Web page), a category corresponding to the content or the content request (e.g., arts, business, computers, arts-movies, arts-music, etc.), part or all of the content request, content age, content type (e.g., text, graphics, video, audio, mixed media, etc.), geolocation information, etc.

The content server may combine the requested content with one or more of the advertisements provided by the system 120. This combined information including the content and advertisement(s) is then forwarded towards the end user that requested the content, for presentation to the viewer. Finally, the content server may transmit information about the ads and how, when, and/or where the ads are to be rendered (e.g., position, click-through or not, impression time, impression date, size, conversion or not, etc.) back to the system 120. Alternatively, or in addition, such information may be provided back to the system 120 by some other means.

Another example of an ad consumer 130 is a search engine. A search engine may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," Seventh International World Wide Web Conference, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine may submit a request for ads to the system 120. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, feature vectors of identified documents, etc.

The search engine may combine the search results with one or more of the advertisements provided by the system 120. This combined information including the search results and advertisement(s) is then forwarded towards the user that requested the content, for presentation to the user. Preferably, the search results are maintained as distinct from the ads, so as not to confuse the user between paid advertisements and presumably neutral search results.

Finally, the search engine may transmit information about the ad and when, where, and/or how the ad was to be rendered (e.g., position, click-through or not, impression time, impression date, size, conversion or not, etc.) back to the system 120. Alternatively, or in addition, such information may be provided back to the system 120 by some other means.

§ 4.1.2 Exemplary AD Entry, Maintenance and Delivery Environment

FIG. 2 illustrates an exemplary ad system 120' in which, or with which, the present invention may be used. The exemplary ad system 120' may include an inventory system 210 and may store ad information 205 and usage information 245. The exemplary system 120' may support ad information entry and management operations 215, campaign (e.g., targeting) assistance operations 220, accounting and billing operations 225, ad serving operations 230, relevancy determination operations 235, optimization operations 240, relative presentation attribute assignment (e.g., position ordering) operations 250, fraud detection operations 255, and result interface operations 260.

Advertisers 110 may interface with the system 120' via the ad information entry and management operations 215 as indicated by interface 216. Ad consumers 130 may interface with the system 120' via the ad serving operations 230 as indicated by interface 231. Ad consumers 130 and/or other entities (not shown) may also interface with the system 120' via results interface operations 260 as indicated by interface 261.

An advertising program may include information concerning accounts, campaigns, creatives, targeting, etc. The term "account" relates to information for a given advertiser (e.g., a unique email address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line have one or more ad groups, each containing one or more ads. Each ad group may include a set of keywords, and a maximum cost bid (cost per click-though, cost per conversion, etc.). Alternatively, or in addition, each ad group may include an average cost bid (e.g., average cost per click-through, average cost per conversion, etc.). Therefore, a single maximum cost bid and/or a single average cost bid may be associated with one or more keywords. As stated, each ad group may have one or more ads or "creatives" (That is, ad content that is ultimately rendered to an end user.). Naturally, the ad information 205 may include more or less information, and may be organized in a number of different ways.

The ad information 205 can be entered and managed via the ad information entry and management operations 215. Campaign (e.g., targeting) assistance operations 220 can be employed to help advertisers 110 generate effective ad campaigns. For example, the campaign assistance operations 220 can use information provided by the inventory system 210, which, in the context of advertising for use with a search engine, may track all possible ad impressions, ad impressions already reserved, and ad impressions available for given keywords. The ad serving operations 230 may service requests for ads from ad consumers 130. The ad serving operations 230 may use relevancy determination operations 235 to determine candidate ads for a given request. The ad serving operations 230 may then use optimization operations 240 to select a final set of one or more of the candidate ads. Finally, the ad serving operations 230 may use relative presentation attribute (e.g., position) assignment operations 250 to order the presentation of the ads to be returned. The fraud detection operations 255 can be used to reduce fraudulent use of the advertising system (e.g., by advertisers), such as through the use of stolen credit cards. Finally, the results interface operations 260 may be used to accept result information (from the ad consumers 130 or some other entity) about an ad actually served, such as whether or not click-through occurred, whether or not conversion occurred (e.g., whether the sale of an advertised item or service was initiated or consummated within a predetermined time from the rendering of the ad), etc. Such results information may be accepted at interface 261 and may include information to identify the ad and time the ad was served, as well as the associated result.

When used with an ad serving system such as that 120' described above with reference to FIG. 2, the present invention may be provided as a part of ad serving operations 230 and may use ad information 205.

§ 4.1.3 Definitions

Online ads, such as those used in the exemplary systems described above with reference to FIGS. 1 and 2, or any other system, may have various features. Such features may be specified by an application and/or an advertiser. These features are referred to as "ad features" below. For example, in the case of a text ad, ad features may include a title line, ad text, executable code, an embedded link, etc. In the case of an image ad, ad features may additionally include images, etc. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad is served (including one or more topics or concepts determined to be associated with the page, information or content located on or within the page, information about the page such as the host of the page (e.g. AOL™, Yahoo™, etc.), the importance of the page as measured by e.g. traffic, freshness, quantity and quality of links to or from the page etc., the location of the page within a directory structure, etc.), a search query or search results associated with the serving of the ad, a user characteristic (e.g., their geographic location, the language they use, the type of browser used, previous page views, previous behavior), a host or affiliate site (e.g., America Online™, Google™, Yahoo™) that initiated the request that the ad is served in response to, an absolute position of the ad on the page on which it is served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as conditions or constraints. When used as serving conditions or constraints, such serving parameters are referred to simply as "serving constraints". For example, in some systems, an advertiser may be able to specify that its ad is only to be served on weekdays, no lower than a certain position, only to users in a certain location, etc. As another example, in some systems, an advertiser may specify that its ad is to be served only if a page or search query includes certain keywords or phrases.

"Ad information" may include any combination of ad features, ad serving constraints, information derivable from ad features or ad serving constraints (referred to as "ad derived information"), and/or information related to the ad (referred to as "ad related information"), as well as an extensions of such information (e.g., information derived from ad related information).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

A document may include one or more "available ad spots". Such available ad spots may be predetermined and be an inherent part of the document, may be subject to change, and/or may be determined as the document is being served. An ad consumer 130 may request ads from an ad server 120 to fill some or all of such available ad spots. An ad spot may be able to accommodate different type of ads, but may specify a certain type of ad. An "ad spot type" refers to a type of ad to be shown in an ad spot if that ad spot (or an ad consumer) specifies a certain type of ad. An ad spot type may specify what is to be served (e.g., text, graphics, images, audio, and/or video). Alternatively, or in addition, an ad spot type may specify how an ad is to be rendered (e.g., in a small box, in a larger box, in a particular shape, in a particular shape of a particular size, in a right/left/top/bottom margin of a document, mixed in with the content of a document, temporarily obstructing the content of a document, a volume of audio, a quality of audio and/or video, etc.) with the document. Alternatively, or in addition, an ad spot type may specify when the document having the ad spot is served. Finally, alternatively, or in addition, an ad spot type may specify something about the document (e.g., a preferred Website, a normal Website, a budget Website, etc.) having the available ad spot. Sometimes, a document may include more than one ad spots of the same ad spot type. For example, a document may include five (5) ad spots in its right margin. Sometimes, a document may include more than one ad spot type. For example, a document may include a mixed with content, video clip ad spot type, a top margin-text ad spot type, and a side margin-text ad spot type. Moreover, a document may include more than one ad spot type, each having one or more ad spots. For example, a document may have two (2) ad spots of the ad spot type top margin text, and five (5) ad spots of the ad spot type left side margin text .

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

Various exemplary embodiments of the present invention are now described in § 4.2.

§4.2 Exemplary Embodiments

Figure 3B:
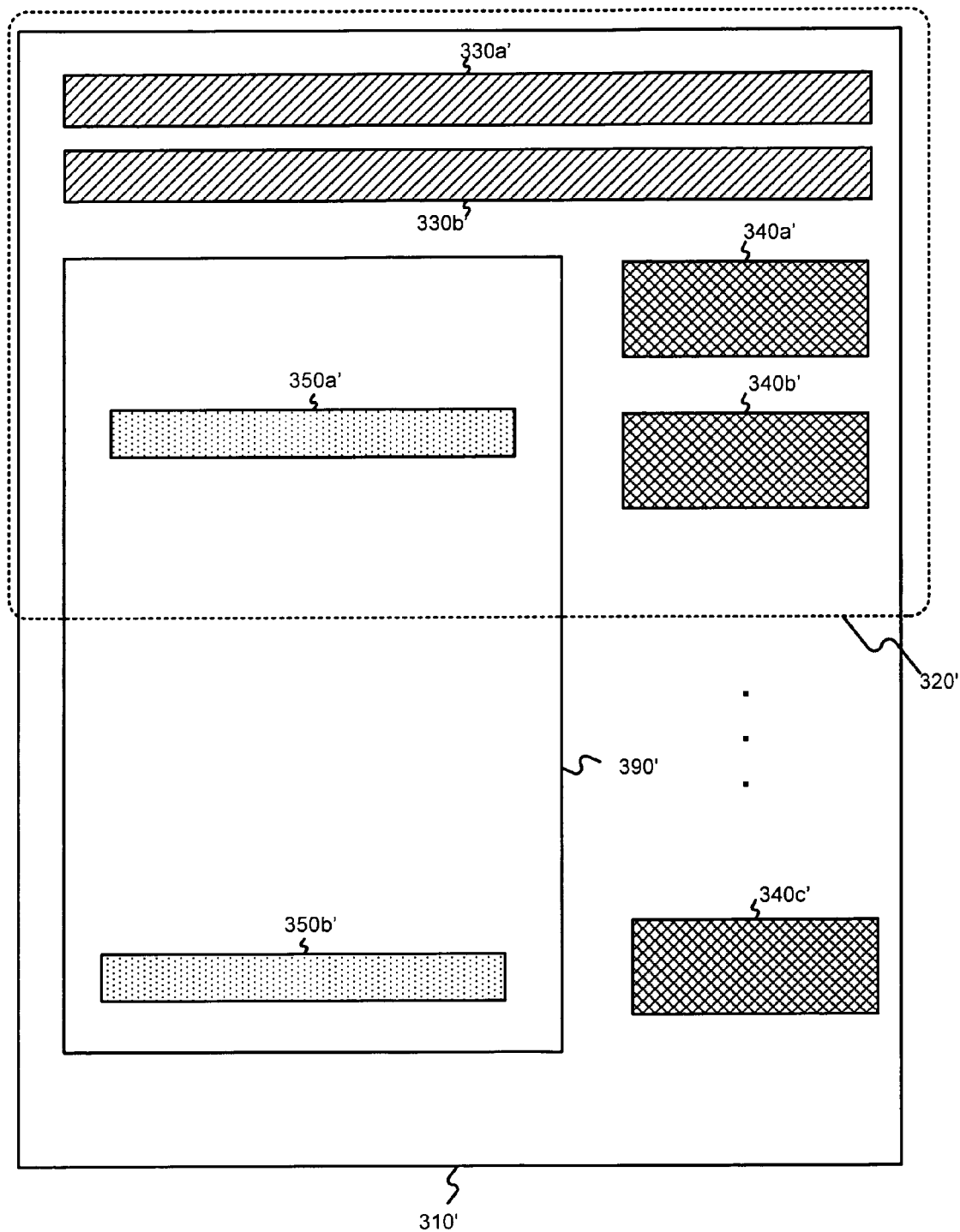

The embodiments below will be described in reference to FIG. 3A, which is an abstract illustration of a document 310. The outline 320 depicted with dashed lines corresponds to a portion of the document 310 that may be viewed on a typical personal computer display screen at a typical resolution. The exemplary document 310 may include content 390 and one or more ad spots. In this example, there are two (2) ad spots 330 of a first ad spot type (e.g., text and image, top margin), at least three (3) ad spots 340 of a second type (e.g., text only, right margin), and two (2) ad spots 350 of a third type (e.g., video in content). It is assumed that certain types of ad spots will generally be preferred by most advertisers over other types of ad spots. For example, referring to FIG. 3B video in content type ad spots 350' will generally be preferred to top margin text and image type ad spots 330', which will generally be preferred to right margin text only ad spots 340'. This concept of preferred ad spot types is different from preferred ad spots within a given ad spot type (e.g., a top position ad spot of a text only right margin type may be preferred to a bottom position ad spot of the same ad spot type). Such preferences may be based on relative general performance (e.g., click-through rate, conversion rate, etc.) of ads in various ad spot types.

Figure 4:
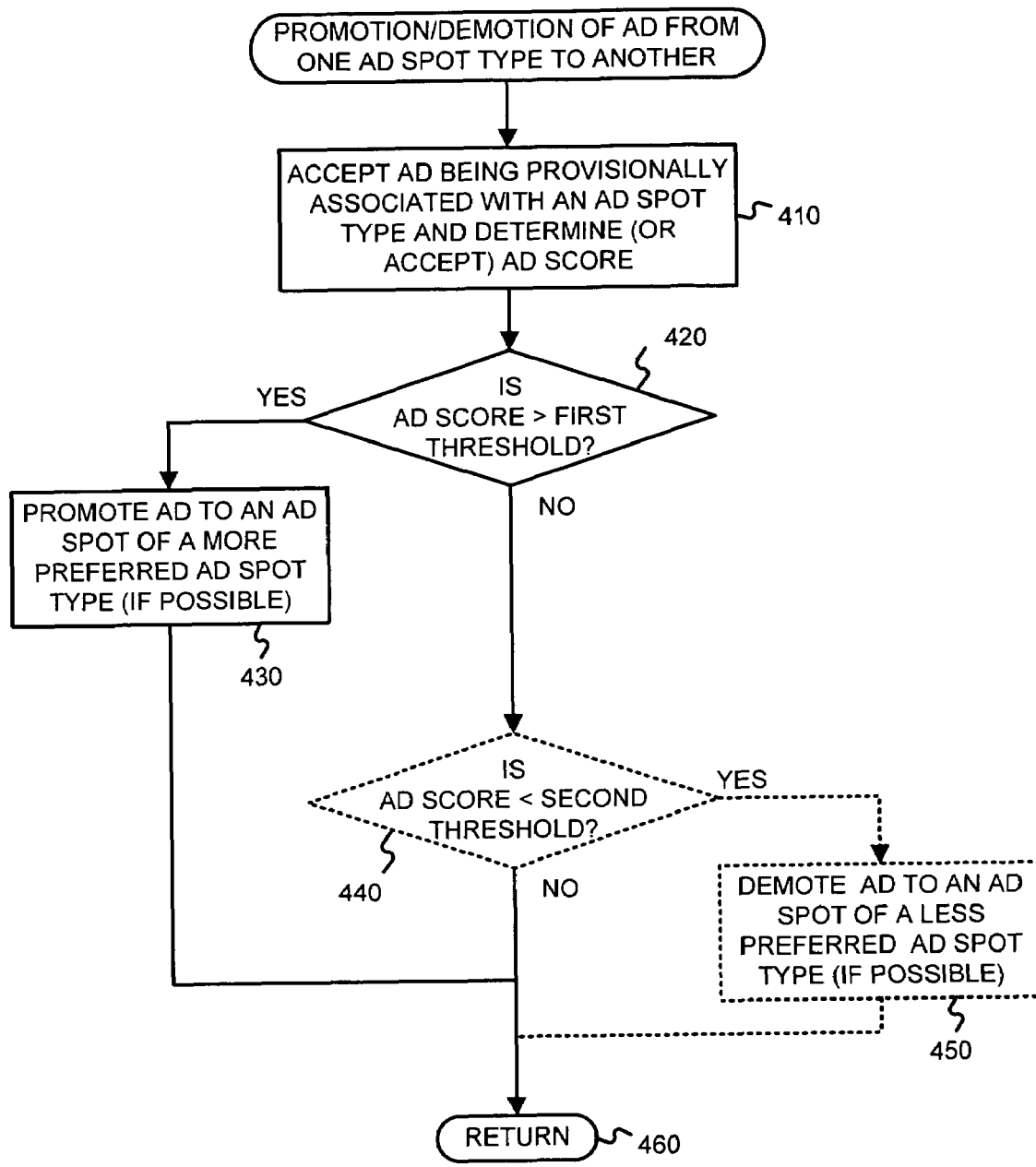
FIG. 4 is a flow diagram of an exemplary method that may be used to promote and/or demote an ad from an ad spot of one type to an ad spot of another type, in a manner consistent with the present invention.

FIG. 4 is a flow chart of an exemplary method 400 that may be used to promote and/or demote an ad from an ad spot of one type to that of another, in a manner consistent with the present invention. An ad being provisionally associated with an ad spot type is accepted, and a score for the ad is determined (or accepted). (Block 410) The ad score is then compared with a first threshold value. (Decision block 420) If the ad score is greater than the first threshold value, then the ad is promoted to an ad spot of a better (e.g., more preferred) ad spot type (assuming that one is available) (Block 430) before the method 400 is left (Node 460).

Still referring to FIG. 4, in various embodiments, the blocks depicted in phantom may be performed instead of, or in addition to, the acts just discussed. More specifically, the ad score may be compared with a second threshold value. (Decision bock 440) If the ad score is less than the second threshold value, then the ad is demoted to an ad spot of a less preferred ad spot type (assuming that one is available) (Block 450) before the method 400 is left (Node 460).

Referring back to block 410 of FIG. 4, a score for an ad may be determined in a number of different ways. For example, the ad score may be (a) a function of a monetary amount (e.g., a bid) associated with the ad, (b) a function of performance information (e.g., composed of one or more performance parameters (e.g., click-through rate, conversion rate, user rating, etc.)) of the ad, (c) a function of performance information estimate of the ad, and (d) any combination of one or more of the foregoing. Various ways of determining a score which may be used in a manner consistent with the present invention are described in U.S. patent application Ser. No. 10/112,656, entitled "METHODS AND APPARATUS FOR ORDERING ADVERTISEMENTS BASED ON PERFORMANCE INFORMATION", filed on Mar. 29, 2002 and listing Jane Manning, Salar Arta Kamangar, Eric Veach and Lawrence E. Page as the inventors, and U.S. patent application Ser. No. 10/112,654, entitled "METHODS AND APPARATUS FOR ORDERING ADVERTISEMENTS BASED ON PERFORMANCE INFORMATION AND PRICE INFORMATION", filed on Mar. 29, 2002 and listing Salar Arta Kamangar, Ross Koningstein and Eric Veach as the inventors. Both of these applications are incorporated herein by reference.

Referring back to decision blocks 420 and 440 of FIG. 4, other promotion and demotion tests can be used. For example, an ad score may be compared with a function of one or more ad scores of other ads in one or more ad spot types. Moreover, the threshold values may be determined in a number of ways. They can be predetermined and static. They can be determined on demand. For example, the thresholds can be a function of one or more other ads, and/or one or more other ads spots, etc.

Referring back to blocks 430 and 450 of FIG. 4, rather than promoting and demoting the ad, respectively, as a necessary consequence of the conditions set forth in decision blocks 420 and 440, respectively, being met, the ad can be tagged as a candidate for promotion (or demotion), with actual promotion (or demotion) of the ad being subject to one or more further conditions.

Figure 5:
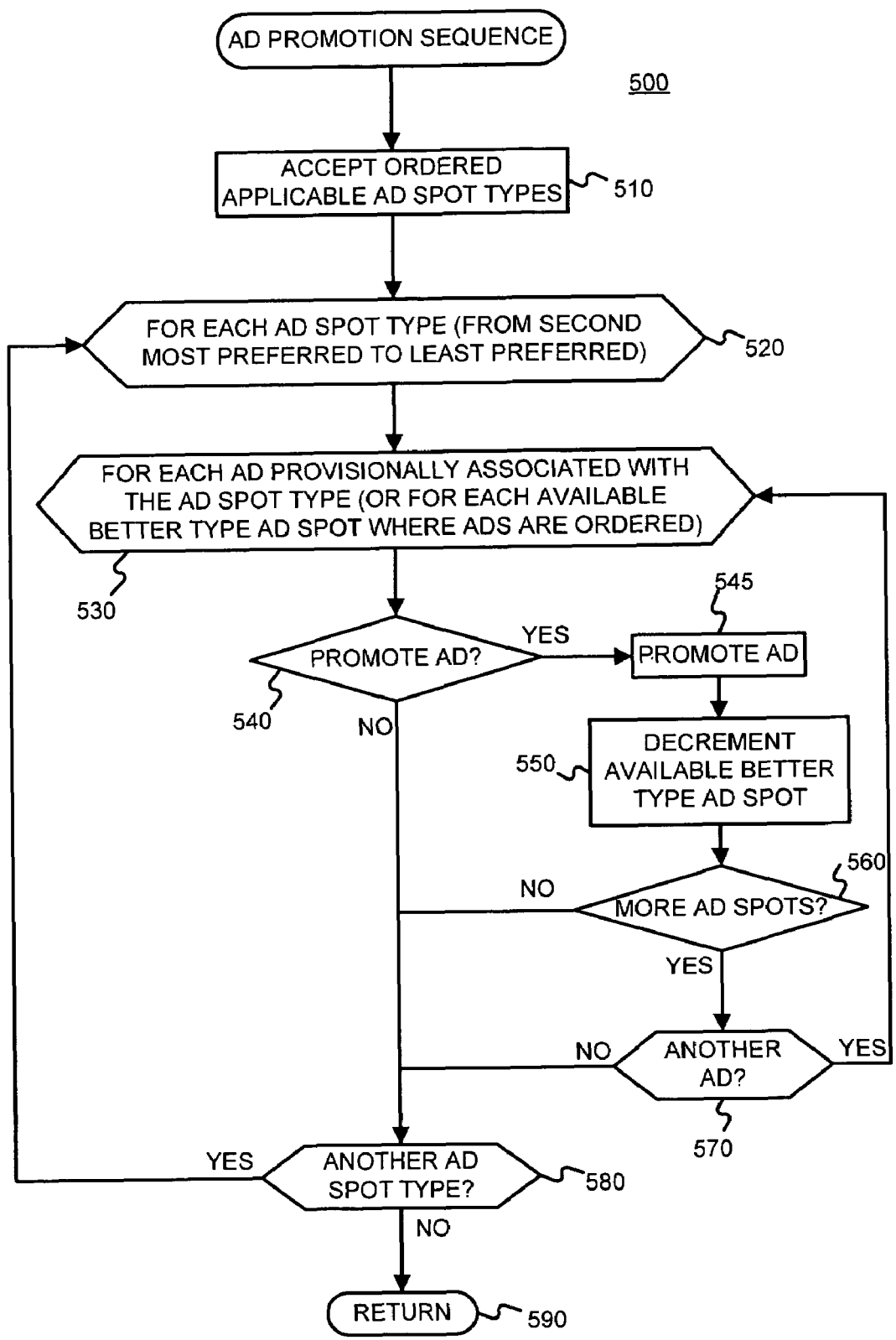
FIG. 5 is a flow diagram of an exemplary method for determining a sequence in which ads may be promoted (or demoted) in a manner consistent with the present invention.

FIG. 5 is a flow chart of an exemplary method 500 that may be used to sequence the promotion of ads from an ad spot of one ad spot type to that of another, in a manner consistent with the present invention. Basically, where there are multiple ad spot types, a promotion or demotion of an ad from an ad spot of one ad spot type to that of another may affect whether or not other promotions or demotions are possible. In the exemplary method 500, ordered ad spot types (e.g., applicable to a given document to be served with ads) may be accepted. (Block 510) For each ad spot type (preferably staring from the second most preferred ad spot type), a number of acts are performed. (Loop 520-580) Within a given ad spot type, for each ad (or for each available ad spot of a preferred type, where ads are ordered, for example, based on their scores) being provisionally associated with the ad spot type, a number of acts are performed. (Loop 530-570) For example, it is determined whether or not to promote an ad. (Decision block 540) This may be done, for example, by comparing an ad score with a threshold value as described above with reference to FIG. 4. If the ad is to be promoted, it is promoted (Block 545) and the number of available better type ad spots will be reduced by one (Block 550). If there are no more ad spots of the current type, a next ad spot type (if any) is processed. (Decision blocks 560 and 580) If, on the other hand, there are more ad spots, it is determined whether or not there is another ad (e.g., in the ordered set). (Block 570) If so, the method 500 branches back to node 530. Otherwise, the method 500 branches to decision block 580. Once all ad spot types are processed, the method 500 is left. (Return node 590)

The demotion of ads from an ad spot of one ad spot type to that of a less preferred ad spot type may be similar, but the ordering of processing ad spot types and ads within an ad spot should be revised (e.g., from second worst ad spot type to best, and from the ad with the worst score to the ad with the best score).

Figure 6:
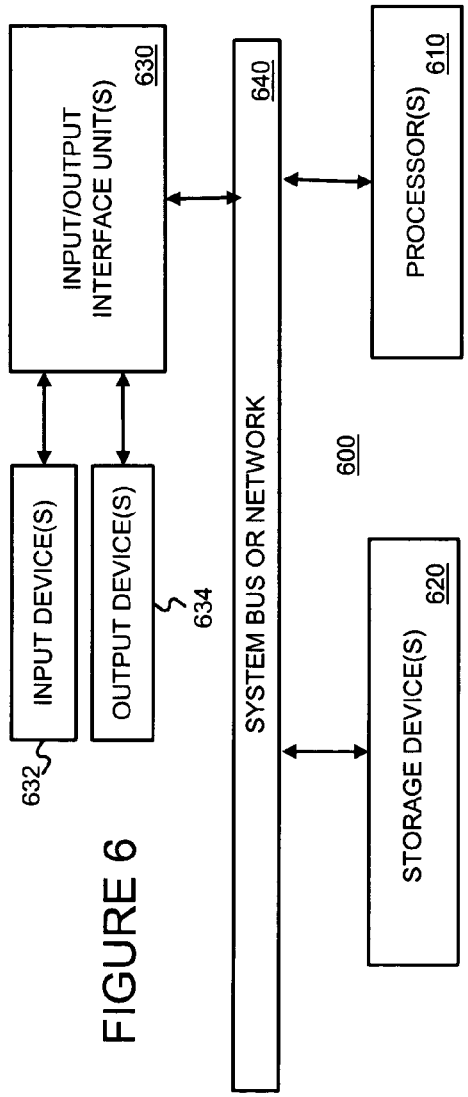
FIG. 6 is a high-level block diagram of apparatus that may be used to effect at least some of the various operations that may be performed, and store various information that may be used and/or generated in a manner consistent with the present invention.

FIG. 6 is high-level block diagram of a machine 600 that may effect one or more of the operations discussed above. The machine 600 basically includes a processor(s) 610, an input/output interface unit(s) 630, a storage device(s) 620, and a system bus or network 640 for facilitating the communication of information among the coupled elements. An input device(s) 632 and an output device(s) 634 may be coupled with the input/output interface(s) 630.

The processor(s) 610 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the storage device(s) 620 and/or may be received from an external source via an input interface unit 630.

In one embodiment, the machine 600 may be one or more conventional personal computers. In this case, the processing unit(s) 610 may be one or more microprocessors. The bus 640 may include a system bus. The storage devices 620 may include system memory, such as read only memory (ROM) and/or random access memory (RAM). The storage device(s) 620 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 632, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 610 through an appropriate interface 630 coupled to the system bus 640. However, in the context of the present invention, no input devices, other than those needed to accept ad spot information, ad spot type information, and ad information, and possibly those for system administration and maintenance, are needed.

The output device(s) 634 may include a monitor or other type of display device, which may also be connected to the system bus 640 via an appropriate interface. In addition to (or instead of) the monitor, the personal computer may include other (peripheral) output devices (not shown), such as speakers and printers for example. Again, in the context of presentation ordering operation(s), no output devices, other than those needed to communicate served ads and the ad spots on which they have been placed, and possibly those for system administration and maintenance, are needed.

§ 4.2.1 Alternatives

In one embodiment, ads can only be promoted (and/or demoted) to a next more (and/or less) preferred ad spot type. Alternatives in which an ad can be promoted (demoted) more than one ad spot type are possible.

Figure 7:
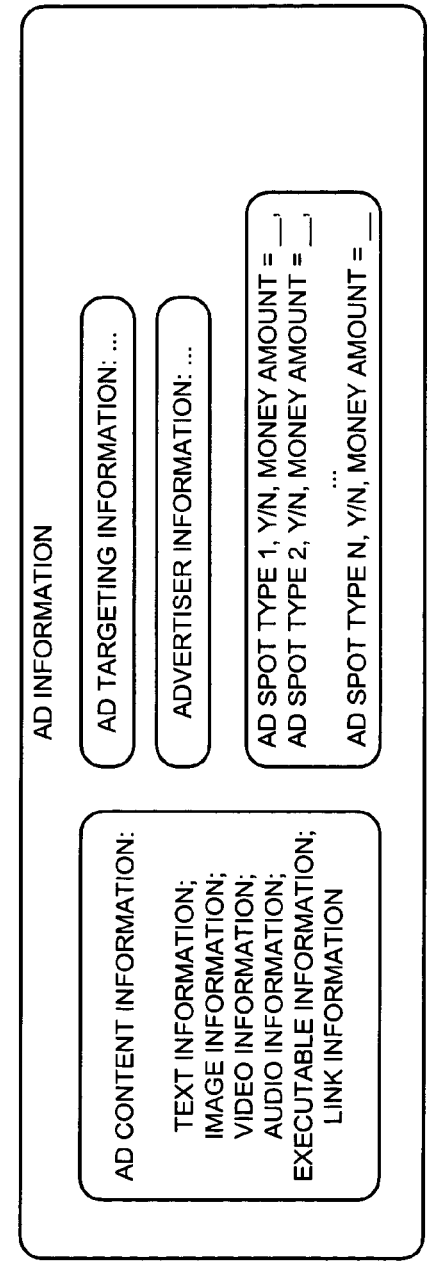
FIG. 7 illustrates exemplary ad information that may be associated with an ad.

If an ad is promoted or demoted to an ad spot of a different type, ad information for rendering the ad should be compatible with the ad spot type. The degree of compatibility can be adjusted in accordance with the present invention and it is contemplated that the degree of compatibility needed will often be application specific. For example, an ad with only text information might be compatible with an audio type ad spot if the text can be converted to speech. As another example, a video ad might be compatible with an image type ad spot if a video frame can be used as an image. As shown in FIG. 7, a given ad may have multiple types of ad information 700, so that the set of ad information used will depend on the ad spot type. Generally ad information 700 will specify what types of ad spots the advertiser wants the ad to compete for.

Ads may be promoted and/or demoted such that an expected economic value of the sum of the ads served with the document is maximized or increased. In some cases, this may lead to showing less ads or demoting ads. (Demoting ads, in a general sense, can include removing ads.) For example, if advertisers pay for their ads only when they are selected (e.g., clicked), it may be the case that ads shown without other ads will have a better click-through rate. To illustrate this point, suppose ad A will pay $1.00 per click and has a click-through rate of 50% when shown (e.g., in an ad spot type) alone, but only 10% when shown with another ad, and suppose that ad B will pay $0.15 per click and has a click-through rate of 33%, independent of whether or not other ads are shown. If a document has two ad spots in which ad A and ad B may be served, the expected economic value of serving both ads is $0.15(=$1.00×0.10+$0.15×0.33), while the expected economic value of serving only ad A is $0.50(=$1.00×0.50).

§ 4.2.2 Exemlpary Embodiment in which the Present Invention is Applied to a Specific Web Page Having Specific AD Spot Types An exemplary embodiment of the present invention is now described, in which ads may be promoted by relocating web advertisements from a less prominent location on a web page to a more prominent location. A special form of promotion called "trumping" refers to when a web advertisement is relocated from a less prominent location and displaces another advertisement in a more prominent location. Promoting advertisements into a more prominent location should result in both higher click-through rates and more brand awareness (which equates to more value for the advertiser). However, poorly targeted advertisements that are off topic with the rest of the web page content may disappoint users, increasing the likelihood that they will ignore the more prominent advertising position in the future. (Traditionally, more prominent locations have been reserved for larger advertising contracts. Advertisements for such prominent locations may have been placed there by manual intervention of a highly trained sales and support staff, while less prominent location were made available to smaller self-service advertisers.)

This embodiment of the present invention allows the self service advertisements to be promoted into the more prominent position. This embodiment may include of a human evaluation component and an automatic statistics gathering and mathematical analysis component. To be eligible for promotion, the self-service ads should be hand-checked by a separate group of highly trained coordinators. These coordinators may perform initial quality checks of the ad and mark it as approved. Once approved, an ad may have been running in the less prominent right hand side position. Ad click-through statistics are measured. The rate at which users click on an ad may be used as a secondary measure of relevance and ad quality. If the advertisement has been approved and has a sufficient click-through rate then the ad may be eligible for promotion. Other techniques for determining advertisement eligibility may include semantic text matching or advertiser PageRank analysis. Once an ad is eligible for promotion, it is determined whether to promote the ad. If no other ads are being considered for the top ad locations, then the decision is easy. For example, a minimum price for the top position may be set (e.g., to offset the value of having no advertising in the top position). In one embodiment, if the expected value of promoting an ad is greater than this price, then the ad is promoted.

The expected value of promotion may be calculated by multiplying the revenue generated by an ad being selected by the increase in the likelihood of a selection. Both the promoted ad and the other ads in the location that it is being promoted from may be included in a total expected value calculation. Other ads in the source location are typically shifted up within the same location, resulting in an increased likelihood of selection.

Promotion may also occur in one extra space in the source location. If this extra space can be used by an ad that otherwise would not have been shown, the expected value of showing that ad is also included.

If an ad is eligible for promotion, but other ads have been sold into the more prominent location, then "trumping" may be considered. In one embodiment an ad can only be trumped if contractual obligations of the potentially trumped ad can be met (or are estimated as being met) and if the expected value of promoting the other ads is greater than the revenue obtained from the potentially trumped ad.

In some instances, promoted advertisements may need to be reformatted to fit layout dimensions of the more prominent location on the Web page. Text advertisements are easier to reformat. For example, on Google.com, the advertisements in the less prominent right hand side location include four (4) narrow lines of text: the call-to-action, line 1, line 2 and the visible URL. These are reformatted to two (2) wide lines of text in the more top location. In the top location, the first line is the call-to-action by itself and the second line is composed from the visible url, highlighted in a different font color, followed by line 1 and line 2 concatenated together. The present invention is not limited to this particular embodiment.

§ 4.3 Illustrative Operations of Exemplary Embodiments of the Present Invention

Figure 8:
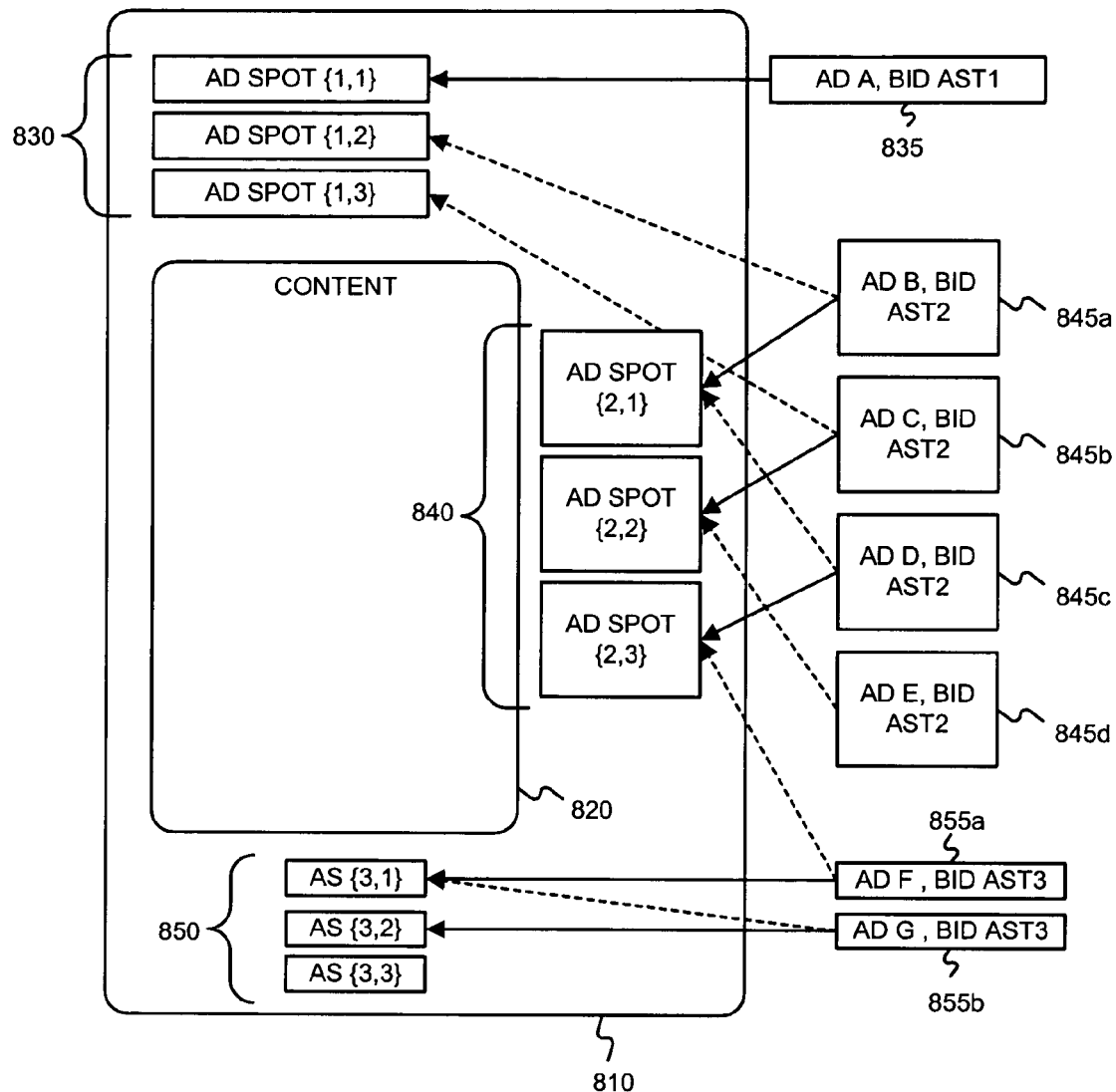
FIG. 8 illustrates the promotion of ads from an ad spot of one type to that of another type under an exemplary embodiment of the present invention.

FIG. 8 illustrates an application of an exemplary embodiment of the present invention to an exemplary document 810. The exemplary document 810 includes content 820, three (3) ad spots 830 of a first type, three (3) ad spots 840 of a second type, and three (3) ad spots 850 of a third type. In each case, an ad spot is indexed by {ad spot type, intra-type position}. It is assumed that ad spots 830 of the top margin type are preferred over ad spots 840 of the right margin type, which are preferred over ad spots 850 of the bottom margin type.

An ad may compete for an ad spot of a particular type, ad spots of more than one type, or for ad spots of any type. (Recall, e.g., ad information 700). For example, assume that an ad has text information and image information, but not video information or audio information. Such an ad could compete for ad spots of a text only type, ad spots of an image only type, or ad spots of a text and image type. Such an ad would probably not compete for an ad spot of a video type or of an audio type (unless, for example, the text could be converted to audio). Thus, whether an ad can be promoted (of demoted) from one ad spot type to another may be subject to some ad information compatibility test.

Referring now to the example of FIG. 8, ad A 835 competes for an ad spot of type 1 ("AST 1") 830, each of ads B 845*a*, C 845*b*, D 845*c*, and E 845*d* competes for an ad spot of type 2 ("AST 2") 840, and each of ads F 855*a* and G 855*b* competes for an ad spot of type 3 ("AST 3") 850. As shown, each of the ads may include an associated monetary amount (e.g., a bid amount the advertiser is willing to pay for a particular result such as an impression, a click-through, a conversion, etc.). Assume further that the ads shown are all eligible candidate ads to fill available ad spots of document 810. For example, an ad may be an eligible candidate ad if it meets a certain measure of relevance with respect to the document 810. Finally, assume that the ads competing for one or more ad spots of a particular type are rank ordered by some score. Various ways of determining a score which may be used in a manner consistent with the present invention are described in U.S. patent application Ser. No. 10/112,656, entitled "METHODS AND APPARATUS FOR ORDERING ADVERTISEMENTS BASED ON PERFORMANCE INFORMATION", filed on Mar. 29, 2002 and listing Jane Manning, Salar Arta Kamangar, Eric Veach and Lawrence E. Page as the inventors and U.S. patent application Ser. No. 10/112,654, entitled "METHODS AND APPARATUS FOR ORDERING ADVERTISEMENTS BASED ON PERFORMANCE INFORMATION AND PRICE INFORMATION", filed on Mar. 29, 2002 and listing Salar Arta Kamangar, Ross Koningstein and Eric Veach as the inventors.

If the present invention were not applied to this example, ad A 835 would be provided in ad spot {1,1}, and the other ad spots of the first type (ad spot {1,2} and ad spot {1,3}) would be empty. Moreover, ad B 845*a* would be provided in ad spot {2,1}, ad C 845*b* would be provided in ad spot {2,2} and ad D 845*c* would be provided in ad spot {2,3}. Ad E 845*d* would fail to be served with the document 810. Finally, ad F 855*a* would be provided in ad spot {3,1}, ad G 855*b* would be provided in ad spot {3,2}, while ad spot {3,3} would be empty.

Assume that there is a threshold score $T_{2-1}$ needed to promote an ad from an ad spot of the second type to an ad spot of the first type, and that there is a threshold score $T_{3-2}$ needed to promote an ad from an ad spot of the third type to an ad spot of the second type. In this example it is assumed that the ad B 845*a* and ad C 845*b* each have a score that meets or exceeds threshold $T_{2-1}$ and that ad F 855*a* has a score that meets or exceeds threshold $T_{3-2}$. As shown by the dashed lines, in accordance with the exemplary embodiment of the invention, in which ads are processed for promotion in a manner such as shown in FIG. 5, ad B 854*a* is promoted to ad spot {1,2}, ad C 845*b* is promoted to ad spot {1,3}, ad D 845*c* gets a better position within the group of ad spots of type 2 840, ad E 845*d* is now served, taking ad spot {2,2}, ad F 855*a* is promoted to ad spot {2,3} and ad G 855*b* gets a better position within the group of ad spots of type 3 850.

As can be appreciated from this example, ads can be promoted to better ad spot types and/or to better positions within an ad spot type. Therefore, such ads should perform better. In an ad server where the revenue is a function of a performance result, this should increase revenues.

§ 4.4 Conclusions

As can be appreciated from the foregoing disclosure, present invention can be used to promote and/or demote ads from one ad spot type to another. In doing so, ads can be allocated to otherwise empty or inefficiently used ad spots.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

What is claimed is:

1. A computer-implemented method for associating advertisements with ad spots of a document, the document having at least one ad spot of a first ad spot type and at least one ad spot of a second ad spot type, the computer-implemented method comprising:
   a) accepting an advertisement having a score and being provisionally associated with an ad spot of the first ad spot type;
   b) determining whether to move the advertisement from the ad spot of the first ad spot type to a vacant ad spot of the second ad spot type based on the score of the advertisement; and
   c) if it is determined to move the advertisement from the ad spot of the first ad spot type to the vacant ad spot of the second ad spot type, then assigning the advertisement to the vacant ad spot of the second ad spot type, otherwise assigning the advertisement to the ad spot of the first ad spot type; and
   d) serving the advertisement for rendering with the document.

2. The computer-implemented method of claim 1 wherein the ad spots of the second ad spot type are associated with higher selection rates than selection rates associated with ad spots of the first ad spot type.

3. The computer-implemented method of claim 1 wherein the ad spots of the second ad spot type are associated with higher conversion rates than conversion rates associated with ad spots of the first ad spot type.

4. The computer-implemented method of claim 1 wherein ad spots have ad spot performance scores, wherein the ad spot performance scores are based on at least one of (A) click through rate, and (B) conversion rate, and wherein the ad spots of the first ad spot type are associated with higher ad performance scores than performance scores associated with ad spots of the second ad spot type.

5. The computer-implemented method of claim 1 wherein the score of the advertisement is a function of at least one performance parameter of the advertisement.

6. The computer-implemented method of claim 5 wherein the at least one performance parameter is selected from a group of performance parameters consisting of the performance information is a measure of user interest in the associated advertisement and may be a function of one or more of the following: (a) a click-through rate of the associated advertisement, (b) user ratings of the advertisement, (c) focus group ratings of the advertisement, (d) a measure of user interest for the advertisement weighted for a size of the advertisement relative to that of other advertisements, (a) a measure of user interest for the advertisement weighted for past positions of the advertisement relative to those past positions of other advertisements, (f) expected user interest in the advertisement, (g) a time needed to render the advertisement relative to that needed to render other advertisements, (h) a measure of user interest for the advertisement weighted for a media type of the advertisement, and (i) a conversion rate associated with the advertisement.

7. The computer-implemented method of claim 1 wherein the score of the advertisement is a function of a monetary amount associated with the advertisement.

8. The computer-implemented method of claim 1 wherein the score of the advertisement is a function of at least one performance parameter of the advertisement and a monetary amount associated with the advertisement.

9. The computer-implemented method of claim 8 wherein the at least one performance parameter is selected from a group of performance parameters consisting of the performance information is a measure of user interest in the associated advertisement and may be a function of one or more of the following: (a) a click-through rate of the associated advertisement, (b) user ratings of the advertisement, (c) focus group ratings of the advertisement, (d) a measure of user interest for the advertisement weighted for a size of the advertisement relative to that of other advertisements, (e) a measure of user interest for the advertisement weighted for past positions of the advertisement relative to those past positions of other advertisements, (f) expected user interest in the advertisement, (g) a time needed to render the advertisement relative to that needed to render other advertisements, (h) a measure of user interest for the advertisement weighted for a media type of the advertisement, and (i) a conversion rate associated with the advertisement.

10. The computer-implemented method of claim 1 wherein the first ad spot type is selected from a group of ad spot types consisting of (A) text only, (B) text and video, (C) text and audio, (D) text, audio and video, (E) text and image, (F) text, image and video, (G) text, image, audio and video, (H) text, image, audio and video, (I) video only, (J) audio only, (K) audio and video, (L) image only, (M) image and audio, (N) image and video, and (O) image, audio and video, and wherein the second ad spot type is selected from a group of ad spot types consisting of (A) text only, (B) text and video, (C) text and audio, (D) text, audio and video, (E) text and image, (F) text, image and video, (G) text, image and audio, (H) text, image, audio and video, (I) video only, (J) audio only, (K) audio and video, (L) image only, (M) image and audio, (N) image and video, and (O) image, audio and video, but excluding the selected ad spot type of the first ad spot type.

11. The computer-implemented method of claim 10 wherein each of the first and second ad spot types is selected from a group of ad spot types consisting of (A) mixed with content, (B) temporarily obscuring content, (C) upper document margin, (D) lower document margin, (E) left document margin, and (F) right document margin.

12. The computer-implemented method of claim 1 wherein each of the first and second ad spot types is selected from a group of ad spot types consisting of (A) mixed with content, (B) temporarily obscuring content, (C) upper document margin, (D) lower document margin, (E) left document margin, and (F) right document margin.

13. The computer-implemented method of claim 1 wherein ads served in ad spots of the first ad spot type have a different footprint when served with a document than ads served in ad spots of the second ad spot type.

14. The computer-implemented method of claim 1 wherein ads served in ad spots of the first ad spot type have a different shape when served with a document than ads served in ad spots of the second ad spot type.

15. The computer-implemented method of claim 1 wherein ads served in ad spots of a first ad spot type have a different audio volume when served with a document than ads served in ad spots of a second ad spot type.

16. The computer-implemented method of claim 1 wherein ads served in ad spots of a first ad spot type have a different resolution when served in association with a document than ads served in ad spots of a second ad spot type.

17. The computer-implemented method of claim 1 wherein the document includes content which defines a content screen area including non-advertising content, wherein ad spots of the second type are within the defined content screen area, and wherein ad spots of the first type are outside of the defined content screen area.

18. The computer-implemented method of claim 1 wherein the act of assigning the advertisement to the ad spot of the second ad spot type if it is determined to move the advertisement from the ad spot of the first ad spot type to the ad spot of the second ad spot type, includes reformatting the advertisement.

19. The computer-implemented method of claim 1 wherein the act of assigning the advertisement to the ad spot of the second ad spot type if it is determined to move the advertisement from the ad spot of the first ad spot type to the ad spot of the second ad spot type, includes converting text of the advertisement to audio.

20. The computer-implemented method of claim 1 wherein the act of determining whether to move the advertisement from an ad spot for the first ad spot type to an ad spot of the second ad spot type based on the score of the advertisement includes comparing the score of the advertisement with a threshold value, and wherein the threshold is predetermined and static.

21. The computer-implemented method of claim 1 wherein the act of determining whether to move the advertisement from an ad spot for the first ad spot type to an ad spot of the second ad spot type based on the score of the advertisement includes comparing the score of the advertisement with a threshold value, and
    wherein the threshold is a predetermined selection rate.

22. The computer-implemented method of claim 1 wherein the act of determining whether to move the advertisement from an ad spot for the first ad spot type to an ad spot of the second ad spot type based on the score of the advertisement includes comparing the score of the advertisement with a threshold value, and
    wherein the threshold is a predetermined score.

23. The computer-implemented method of claim 1 wherein the act of assigning the advertisement to the ad spot of the second ad spot type if it is determined to move the advertisement from the ad spot of the first ad spot type to the ad spot of the second ad spot type, only occurs if information for rendering the ad is compatible with the second ad spot type.

24. The computer-implemented method of claim 1 wherein, for each set of ad spots of a given ad spot type, an ad score-based ordering of advertisements has been determined corresponding to each of the ad spots of the set,
    wherein the provisional association of the advertisement to the ad spot is in accordance with the determined ordering of the first ad spot type, and
    wherein the ad-score based ordering was determined based on advertisement scores, each of which is a function of at least one performance parameter of the advertisement and a monetary amount associated with the advertisement.

25. A computer-implemented method for associating advertisements with ad spots of a document, the document having at least one ad spot of a first ad spot type, at least one ad spot of a second ad spot type, and at least one ad spot of a third type, where the first ad spot type is preferred over the second ad spot type which is preferred over the third ad spot type, the computer-implemented method comprising:
    a) provisionally assigning each of a plurality of advertisements, each having a score, to an ad spot of a particular ad spot type;
    b) determining whether there are any ad spots of the first ad spot type without an assigned advertisement to determine available ad spots of the first ad spot type;
    c) if it is determined that there is an available ad spot of the first ad spot type, then for each such available ad spot, determining whether to move an advertisement provisionally assigned to an ad spot of the second ad spot type to an available ad spot of the first ad spot type based on the score of the advertisement;
    d) if it is determined to move the advertisement from the ad spot of the second ad spot type to the available ad spot of the first ad spot type, then assigning the advertisement to the available ad spot of the first ad spot type, otherwise assigning the advertisement to an ad spot of the second ad spot type;
    e) determining whether there are any ad spots of the second ad spot type without an assigned advertisement to determine available ad spots of the second ad spot type;
    f) if it is determined that there is an available ad spot of the second ad spot type, then for each such available ad spot, determining whether to move an advertisement provisionally assigned to an ad spot of the third ad spot type to an available ad spot of the second ad spot type based on the score of the advertisement; and
    g) if it is determined to move the advertisement from the ad spot of the third ad spot type to the ad spot of the second ad spot type, then assigning the advertisement to the available ad spot of the second ad spot type, otherwise assigning the advertisement to an ad spot of the third ad spot type; and
    h) serving the advertisement for rendering with the document.

26. The computer-implemented method of claim 25 wherein acts (c) and (d) are repeated until there is either (A) no more available ad spots of the first type, or (B) no more ads provisionally assigned to ad spots of the second type.

27. The computer-implemented method of claim 26 wherein acts (f) and (g) are repeated until there is either (A) no more available ad spots of the second type, or (B) no more ads provisionally assigned to ad spots of the third type.

28. The computer-implemented method of claim 25 wherein the act of determining whether to move the advertisement from an ad spot for the second ad spot type to an available ad spot of the first ad spot type based on the score of the advertisement includes comparing the score of the advertisement with a threshold value.

29. The computer-implemented method of claim 28 wherein the advertisements provisionally assigned to ad spots of the second type are ordered based on their score, and wherein acts (c) and (d) are repeated for each of the advertisements provisionally assigned to ad spots of the second type in the order of their scores until there is either (A) no more available ad spots of the first type, (B) no more ads provisionally assigned to ad spots of the second type, or (C) it is determined not to move an advertisement provisionally assigned to an ad spot of the second type to an available ad spot of the first type.

30. The computer-implemented method of claim 25 wherein each of the first and second ad spot types is selected from a group of ad spot types consisting of (A) text only, (B) text and video, (C) text and audio, (D) text, audio and video, (E) text and image, (F) text, image and video, (G) text, image and audio, (H) text, image, audio and video, (I) video only, (J) audio only, (K) audio and video, (L) image only, (M) image and audio, (N) image and video, and (O) image, audio and video.

31. The computer-implemented method of claim 30 wherein each of the first, second and third ad spot types is selected from a group of ad spot types consisting of (A) mixed with content, (B) temporarily obscuring content, (C) upper document margin, (D) lower document margin, (E) left document margin, and (F) right document margin.

32. The computer-implemented method of claim 25 wherein each of the first, second and third ad spot types is selected from a group of ad spot types consisting of (A) mixed with content, (B) temporarily obscuring content, (C) upper document margin, (D) lower document margin, (E) left document margin, and (F) right document margin.

33. The computer-implemented method of claim 25 wherein ads served in ad spots of the first ad spot type have a different footprint when served on a document than ads served in ad spots of the second ad spot type.

34. The computer-implemented method of claim 25 wherein ads served in ad spots of the first ad spot type have a different shape when served on a document than ads served in ad spots of the second ad spot type.

35. The computer-implemented method of claim 25 wherein ads served in ad spots of a first ad spot type have a different audio volume when served in association with a document than ads served in ad spots of a second ad spot type.

36. The computer-implemented method of claim 25 wherein ads served in ad spots of a first ad spot type have a different resolution when served in association with a document than ads served in ad spots of a second ad spot type.

37. The method of claim 25 wherein the act of determining whether to move the advertisement from an ad spot for the second ad spot type to an available ad spot of the first ad spot type based on the score of the advertisement includes comparing the score of the advertisement with a first predetermined threshold value, and wherein the act of determining whether to move the advertisement from an ad spot for the third ad spot type to an available ad spot of the second ad spot type based on the score of the advertisement includes comparing the score of the advertisement with a second predetermined threshold value.

38. Apparatus for associating advertisements with ad spots of a document, the document having at least one ad spot of a first ad spot type and at least one ad spot of a second ad spot type, the apparatus comprising:
 a) an input for accepting an advertisement having a score and being provisionally associated with an ad spot of the first ad spot type;
 b) means for determining whether to move the advertisement from the ad spot of the first ad spot type to a vacant ad spot of the second ad spot type based on the score of the advertisement; and
 c) means for assigning the advertisement to the vacant ad spot of the second ad spot type if it is determined to move the advertisement from the ad spot of the first ad spot type to the vacant ad spot of the second ad spot type, and otherwise assigning the advertisement to the ad spot of the first ad spot type.

39. The apparatus of claim 38 wherein the ad spots of the second ad spot type are associated with higher selection rates than selection rates associated with ad spots of the first ad spot type.

40. The apparatus of claim 38 wherein ad spots of the second ad spot type are associated with higher conversion rates than conversion rates associated with ad spots of the first ad spot type.

41. The apparatus of claim 38 wherein ad spots have ad spot performance scores, wherein the ad spot performance scores are based on at least one of (A) click through rate, and (B) conversion rate, and wherein the ad spots of the first ad spot type are associated with higher ad performance scores than ad performance scores associated with ad spots of the second ad spot type.

42. The apparatus of claim 38 wherein the score of the advertisement is a function of at least one performance parameter of the advertisement.

43. The apparatus of claim 42 wherein the at least one performance parameter is selected from a group of performance parameters consisting of the performance information is a measure of user interest in the associated advertisement and maybe a function of one or more of the following: (a) a click-through rate of the associated advertisement, (b) user ratings of the advertisement, (c) focus group ratings of the advertisement, (d) a measure of user interest for the advertisement weighted for a size of the advertisement relative to that of other advertisements, (e) a measure of user interest for the advertisement weighted for past positions of the advertisement relative to those past positions of other advertisements, (f) expected user interest in the advertisement, (g) a time needed to render the advertisement relative to that needed to render other advertisements, (h) a measure of user interest for the advertisement weighted for a media type of the advertisement, and (i) a conversion rate associated with the advertisement.

44. The apparatus of claim 38 wherein the score of the advertisement is a function of a monetary amount associated with the advertisement.

45. The apparatus of claim 38 wherein the score of the advertisement is a function of at least one performance parameter of the advertisement and a monetary amount associated with the advertisement.

46. The apparatus of claim 45 wherein the at least one performance parameter is selected from a group of performance parameters consisting of the performance information is a measure of user interest in the associated advertisement and may be a function of one or more of the following: (a) a click-through rate of the associated advertisement, (b) user ratings of the advertisement, (c) focus group ratings of the advertisement, (d) a measure of user interest for the advertisement weighted for a size of the advertisement relative to that of other advertisements, (e) a measure of user interest for the advertisement weighted for past positions of the advertisement relative to those past positions of other advertisements, (f) expected user interest in the advertisement, (g) a time needed to render the advertisement relative to that needed to render other advertisements, (h) a measure of user interest for the advertisement weighted for a media type of the advertisement, and (i) a conversion rate associated with the advertisement.

47. The apparatus of claim 38 wherein the means for determining whether to move the advertisement from an ad spot for the first ad spot type to an ad spot of the second ad spot type based on the score of the advertisement include means for comparing the score of the advertisement with a fixed, predetermined, threshold value.

48. The apparatus of claim 47 wherein the threshold value which is independent of scores of any other ads to be served with the document.

49. The apparatus of claim 38 wherein the first ad spot type is selected from a group of ad spot types consisting of (A) text only, (B) text and video, (C) text and audio, (D) text, audio and video, (E) text and image, (F) text, image and video, (G) text, image and audio, (H) text, image, audio and video, (I) video only, (J) audio only, (K) audio and video, (L) image only, (M) image and audio, (N) image and video, and (O) image, audio and video, and wherein the second ad spot type is selected from a group of ad spot types consisting of (A) text only, (B) text and video, (C) text and audio, (D) text, audio and video, (E) text and image, (F) text, image and video, (G) text, image and audio, (H) text, image, audio and video, (I) video only, (J) audio only, (K) audio and video, (L) image only, (M) image and audio, (N) image and video, and (O) image, audio and video, but excluding the selected ad spot type of the first ad spot type.

50. The apparatus of claim 49 wherein each of the first and second ad spot types is selected from a group of ad spot types consisting of (A) mixed with content, (B) temporarily obscuring content, (C) upper document margin, (D) lower document margin, (E) left document margin, and (F) right document margin.

51. The apparatus of claim 38 wherein each of the first and second ad spot types is selected from a group of ad spot types consisting of (A) mixed with content, (B) temporarily obscuring content, (C) upper document margin, (D) lower document margin, (E) left document margin, and (F) right document margin.

52. The apparatus of claim 38 wherein ads served in ad spots of the first ad spot type have a different footprint when served with a document than ads served in ad spots of the second ad spot type.

53. The apparatus of claim 38 wherein ads served in ad spots of the first ad spot type have a different shape when served with a document than ads served in ad spots of the second ad spot type.

54. The apparatus of claim 38 wherein ads served in ad-spots of a first ad spot type have a different audio volume when served with a document than ads served in ad spots of a second ad spot type.

55. The apparatus of claim 38 wherein ads served in ad spots of a first ad spot type have a different resolution when served in association with a document than ads served in ad spots of a second ad spot type.

56. The apparatus of claim 38 further comprising:
  d) means for serving the advertisement for rendering with the document.

57. A computer-implemented method for associating advertisements with ad spots of a document, the document having at least one ad spot of a first ad spot type and at least one ad spot of a second ad spot type, the computer-implemented method comprising:
  a) ordering the advertisements based on a score;
  b) determining whether to place one of the ordered advertisements in a vacant ad spot of the second ad spot type based on the score of the advertisement; and
  c) if it is determined to place the advertisement in the vacant ad spot of the second ad spot type, then assigning the advertisement to the vacant ad spot of the second ad spot type, otherwise assigning the advertisements to an ad spot of the first ad spot type; and
  d) serving the advertisement for rendering with the document.

58. The computer-implemented method of claim 57 wherein at least one of the ad spots of the second type is not provided with any advertisement.

59. The computer-implemented method of claim 57 wherein the score is a function of at least user interest in the advertisement.

60. The computer-implemented method of claim 57 wherein the score is a function of at least expected user interest in the advertisement.

61. The computer-implemented method of claim 57 wherein each of the advertisements had been determined to be eligible to be served with the document using semantic text matching.

* * * * *

UNITED STATES PATENT AND TRADEMARK OFFICE
CERTIFICATE OF CORRECTION

PATENT NO. : 7,363,302 B2  
APPLICATION NO. : 10/610311  
DATED : April 22, 2008  
INVENTOR(S) : Chad Lester Page 1 of 1

It is certified that error appears in the above-identified patent and that said Letters Patent is hereby corrected as shown below:

Title Page: Item (73) Assignee: Please delete "Googole, Inc." and replace with "Google Inc."

Signed and Sealed this
Twenty-third Day of February, 2016

Michelle K. Lee
*Director of the United States Patent and Trademark Office*